(12) United States Patent
Romano et al.

(10) Patent No.: US 9,697,246 B1
(45) Date of Patent: *Jul. 4, 2017

(54) THEMES SURFACING FOR COMMUNICATION DATA ANALYSIS

(71) Applicant: Verint Systems Ltd., Herzilya Pituach (IL)

(72) Inventors: Roni Romano, Even Yehuda (IL); Yair Horesh, Kfar-Saba (IL)

(73) Assignee: VERINT SYSTEMS LTD., Herzelia, Pituach (IL)

(*) Notice: Subject to any disclaimer, the term of this patent is extended or adjusted under 35 U.S.C. 154(b) by 254 days.

This patent is subject to a terminal disclaimer.

(21) Appl. No.: 14/501,519

(22) Filed: Sep. 30, 2014

Related U.S. Application Data

(60) Provisional application No. 61/884,559, filed on Sep. 30, 2013, provisional application No. 61/884,577, filed on Sep. 30, 2013, provisional application No. 61/884,600, filed on Sep. 30, 2013.

(51) Int. Cl.
*G06F 7/00* (2006.01)
*G06F 17/00* (2006.01)
*G06F 17/30* (2006.01)

(52) U.S. Cl.
CPC .... *G06F 17/30345* (2013.01); *G06F 17/3053* (2013.01)

(58) Field of Classification Search
CPC .................. G06F 17/3069; G06F 17/30734
See application file for complete search history.

(56) References Cited

U.S. PATENT DOCUMENTS

| | | | |
|---|---|---|---|
| 2007/0219776 A1* | 9/2007 | Gamon | G06F 17/27 704/9 |
| 2009/0326947 A1* | 12/2009 | Arnold | G06Q 30/02 704/257 |
| 2010/0223276 A1* | 9/2010 | Al-Shameri | G06F 17/30333 707/769 |

* cited by examiner

*Primary Examiner* — Susan Chen
(74) *Attorney, Agent, or Firm* — Meunier Carlin & Curfman

(57) ABSTRACT

An embodiment of the method of processing communication data to identify one or more themes within the communication data includes identifying terms in a set of communication data, wherein a term is a word or short phrase, and defining relations in the set of communication data based on the terms, wherein the relation is a pair of terms that appear in proximity to one another. The method further includes identifying themes in the set of communication data based on the relations, wherein a theme is a group of one or more relations that have similar meanings, and storing the terms, the relations, and the themes in the database.

15 Claims, 11 Drawing Sheets

| Dendrogram View ✕ | | | |
|---|---|---|---|
| Minimal group size | 10 | | |
| Minimal similarity: | 2.0 | | |
| Node prefix filter: | | | |
| Refresh filter: | (Refresh) | | |
| Search term (press enter to navigate): | | | |

| Node label | Item description | No Of child nodes | Similarity |
|---|---|---|---|
| 1.1.2.1.2.8. | DAVE | 0 | 0.0 |
| 1.1.2.1.2.9. | DENISE | 0 | 0.0 |
| 1.1.2.2. | | 120 | 0.62002814 |
| 1.1.2.2.1. | | 15 | 1.9714615 |
| 1.1.2.2.1.1. | | 6 | 5.5800004 |
| 1.1.2.2.1.1.1. | CHICAGO | 0 | 0.0 |
| 1.1.2.2.1.1.2. | ILLINOIS | 0 | 0.0 |
| 1.1.2.2.1.1.3. | INDIANA | 0 | 0.0 |
| 1.1.2.2.1.1.4. | MICHIGAN | 0 | 0.0 |
| 1.1.2.2.1.1.5. | OHIO | 0 | 0.0 |
| 1.1.2.2.1.1.6. | WISCONSIN | 0 | 0.0 |
| 1.1.2.2.1.2. | | 9 | 5.489583 |
| 1.1.2.2.1.2.1. | APARTMENT | 0 | 0.0 |
| 1.1.2.2.1.2.2. | AVENUE | 0 | 0.0 |
| 1.1.2.2.1.2.3. | DRIVE | 0 | 0.0 |
| 1.1.2.2.1.2.4. | EAST | 0 | 0.0 |
| 1.1.2.2.1.2.5. | NORTH | 0 | 0.0 |
| 1.1.2.2.1.2.6. | ROAD | 0 | 0.0 |
| 1.1.2.2.1.2.7. | SOUTH | 0 | 0.0 |
| 1.1.2.2.1.2.8. | STREET | 0 | 0.0 |
| 1.1.2.2.1.2.9. | WEST | 0 | 0.0 |

Fig. 3

| trigram | talkwithamanager | talkwiththemanager |
|---|---|---|
| tal | 1 | 1 |
| alk | 1 | 1 |
| lkw | 1 | 1 |
| kwi | 1 | 1 |
| wit | 1 | 1 |
| ith | 1 | 1 |
| 1 ⎡ tha | 1 | 0 |
| ⎢ tht | 0 | 1 |
| ⎢ hth | 0 | 1 |
| 2 ⎢ the | 0 | 1 |
| ⎢ hem | 0 | 1 |
| ⎣ ema | 0 | 1 |
| 1 ⎡ ham | 1 | 0 |
| ⎣ ama | 1 | 0 |
| man | 1 | 1 |
| ana | 1 | 1 |
| nag | 1 | 1 |
| age | 1 | 1 |
| ger | 1 | 1 |

Fig. 5

THEMES SURFACING FOR COMMUNICATION DATA ANALYSIS

CROSS-REFERENCE TO RELATED APPLICATION

The present application is based on and claims priority to U.S. Provisional Patent Application Ser. No. 61/884,559, filed Sep. 30, 2013, U.S. Provisional Patent Application Ser. No. 61/884,577, filed Sep. 30, 2013, and U.S. Provisional Patent Application Ser. No. 61/884,600 filed Sep. 30, 2013, the disclosures of which are incorporated herein by reference.

BACKGROUND

The present disclosure relates to the field of automated data processing, and more specifically to the application of ontology programming to process and analyze communication data. In the realms of computer and software sciences and information science, an ontology is a structural framework for organizing information regarding knowledge and linguistics within a domain. The ontology represents knowledge within a domain as a hierarchical set of concepts, and the relationships between those concepts, using a shared vocabulary to denote the types, properties, and interrelationship of those concepts. For example, the ontology models the specific meanings of terms as they apply to that domain.

SUMMARY

An embodiment of the method of processing communication data to identify one or more themes within the communication data includes identifying terms in a set of communication data, wherein a term is a word or short phrase, and defining relations in the set of communication data based on the terms, wherein the relation is a pair of terms that appear in proximity to one another. The method further includes identifying themes in the set of communication data based on the relations, wherein a theme is a group of one or more relations that have similar meanings, and storing the terms, the relations, and the themes in the database.

Another embodiment of the method for processing communication data to identify one or more themes within the communication data includes accessing a set of communication data and identifying terms in the set of communication data, wherein a term is a word or short phrase. The method further includes defining relations in the set of communication data based on the terms, wherein a relation is a pair of terms that appear in proximity to one another, and calculating a relation score for each relation. The method further includes identifying themes in the set of communication data based on the relations and the relation scores, and storing the terms, the relations, and the themes in the database.

An embodiment of a non-transient computer readable medium programmed with computer readable code that upon execution by a processor causes the processor to execute a method of processing a set of communication data comprising accessing a set of communication data and identifying terms in the set of communication data, wherein a term is a word or short phrase. Relations are then defined in the set of communication data based on the terms, wherein a relation is a pair of terms that appear in proximity to one another. A context vector is then identified for each term based on the words appearing before and after that term, and then terms with similar context vectors are grouped into a node. Relations with the same nodes are then grouped into groups of relations. The candidates are then identified in the set of communication data based on the groups of relations and a theme score is calculated for each theme candidate. Themes are identified as both theme candidates having at least a threshold theme score. The terms, the relations, and the themes are then stored in the database.

BRIEF DESCRIPTION OF THE DRAWINGS

FIG. 3 is an example of a dendrogram presented in a graphical user interface.

FIG. 5 is a schematic diagram exemplifying the application of a character trigram similarity algorithm to compare two exemplary terms.

DETAILED DESCRIPTION OF THE DRAWINGS

Figure 1:
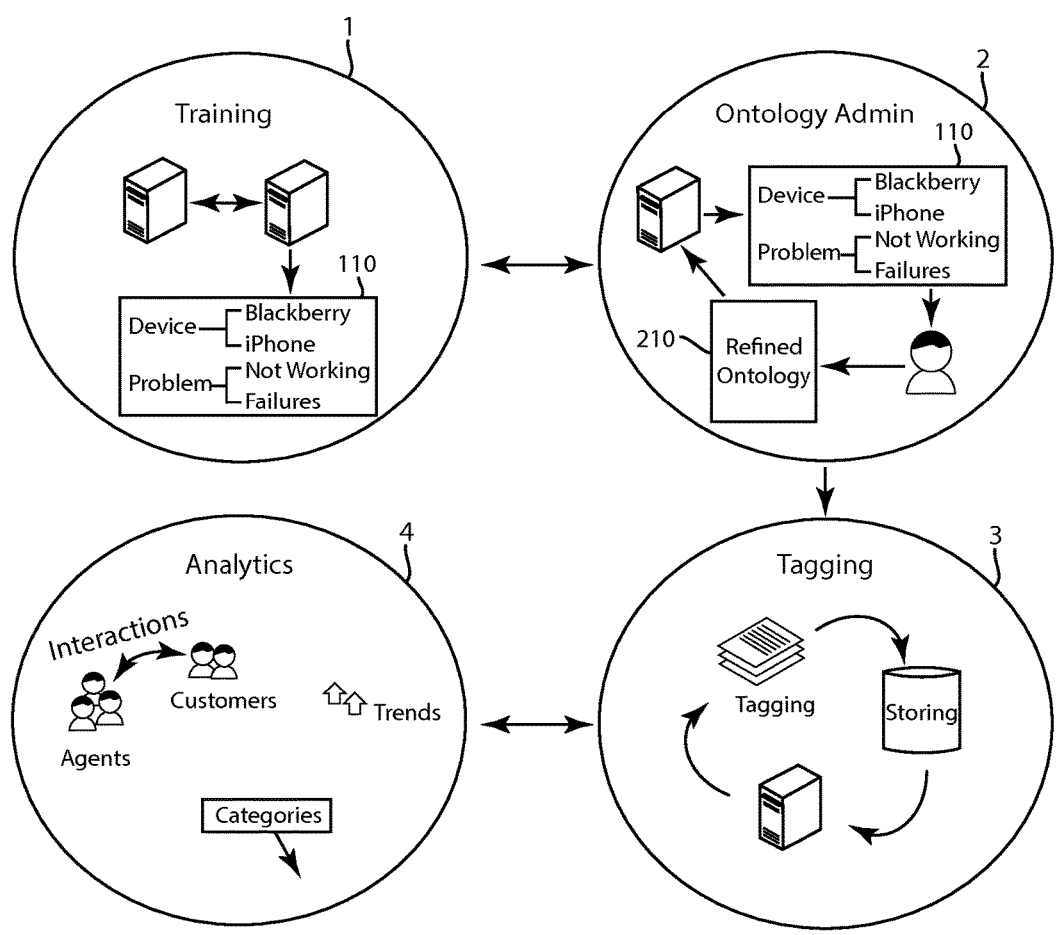
FIG. 1 depicts an exemplary embodiment of the ontology process and programming disclosed herein.

According to the present invention, an ontology may be developed and applied across all types of communication data, for example, all types of customer interactions (which may include interactions in multiple languages) as a tool for processing and interpreting such data. The communication data may document or relate to any type of communication, including communications made via phone, via email, via internet chat, via text messaging, etc. For example, communication data may contain any spoken content or any written correspondence or communication, including but not limited to live speech, audio recording, streaming audio, transcribed textual transcripts, or documents containing written communications, such as manuscripts, web pages, email, physical mail, text messages, chats, etc. In the exemplary context of a customer service application, the communication data may be between a customer service agent or an automated system, such as an interactive voice response (IVR) recording, and a customer or caller. While the present disclosure is often exemplified herein by describing an embodiment involving the analysis of audio data, such as recorded audio transcripts, it is to be understood that in alternative embodiments other forms of oral or written communications may be used or analyzed. A particular ontology may be defined for and applied to any domain, and other examples include financial services, consumer products, subscription services, or some other business application involving communication data interactions.

In the generation or development of an ontology, repeating patterns are identified and ranked based upon statistical significances and then clustered into terms and term relationships. The disclosed solution uses machine learning-based methods to improve the knowledge extraction process in a specific domain or business environment. By formulizing a specific company's internal knowledge and terminology, the ontology programming accounts for linguistic meaning to surface relevant and important content for analysis. For example, the disclosed ontology programming adapts to the language used in a specific domain, including linguistic patterns and properties, such as word order, relationships between terms, and syntactical variations. Based on the self-training mechanism developed by the inventors, the ontology programming automatically trains itself to understand the business environment by processing and analyzing a corpus of communication data.

The disclosed ontology programming, once built and refined for a specific business application, is applied to process communication data to provide valuable analytics for a variety of business needs. For example, the ontology programming can then be utilized to detect and surface meaningful items in a data set, such as a database of recorded employee-customer interactions, and can mine the data set to extract and analyze business data based on an enhanced formulization of a company's internal knowledge and terminology.

An exemplary embodiment of the presently disclosed ontology solution incorporates four main stages. As seen in FIG. 1, the four main stages include training 1, ontology administration 2, ontology tagging 3, and ontology analytics 4. The training step 1 involves internal machine learning in which the system learns the customer's specific domain and formulates an initial ontology 110. The initial ontology 110 is then passed to the ontology administration step 2 wherein the user reviews the initial ontology 110 and refines it to create a refined ontology 210. The refined ontology 210 is then stored and passed to the tagging module 3. Tagging is a continuous online process that uses the ontology to tag tracked items in incoming interactions, and stores the tagged interactions in a persistent repository. Finally, the tagged interactions are then used by the analytics module 4 to analyze and extract business data based on an enhanced formulization of a company's internal knowledge and terminology. A detailed analysis of each stage is addressed in turn.

In the training phase 1, communication data is transformed into a usable format and then use to generate an ontology. For example, audio data from one or more customer interactions between a customer service agent/IVR and a customer/caller can be automatically transcribed into a textual file through speech recognition techniques, and the textual file can be processed as described herein to generate an ontology.

Generally, an ontology as disclosed herein includes terms which are individual words or short phrases that represent the basic units or concepts that might come up in the communication data. Non-limiting examples of terms, as used herein, include "device", "iPhone", "iPhone four", "invoice", "I", "she", "bill", "cancel", "upgrade", "activate", "broken", or "cell phone", "customer care", or "credit card."

However, these are not intended to be limiting in any manner and are merely exemplary of basic units or concepts that may be found in a customer service interaction. In a preferred embodiment, all words in the corpus, or set of communication data, can only be associated with one term, and each term can only be counted once.

Development of an ontology involves the identification of term candidates. A set of communication data used for training purposes is divided into potential terms, or term candidates. Terms are then selected from those term candidates. Strong term candidates contain words or word sets that are compact and, in the instance of word sets, the frequency of finding the word set together is very high. An example of a term containing a word set is "credit card number," as those words very often appear together and refer to a particular, defined object. In addition, good terms often contain words that make more conceptual sense when they are together, as opposed to being on their own. For example, the term "Nova Scotia" is comprised of words that make sense when found together, and would likely not appear or make sense separately.

The frequency that the words of a particular word set, or term, appear together may be referred to as the "stickiness" of the term. A "sticky" term is one whose words appear frequently appear together in the corpus. The higher the stickiness ranking, the stronger the term, as it means that the term has meaning in the corpus as a concept. Salient terms are those that stand out or have a higher score relative to similar or neighboring terms. Non-salient terms and less-salient terms are those that appear many times or a relatively large number of times in many different contexts. The score of such non-salient or less-salient terms is lowered as compared to the score for salient terms. The logic is that salient terms are likely to be meaningful as a concept, whereas non-salient terms are not likely to express a particular concept. For example, the score of the term "account number" would be higher than the score of the term "the account number" because the word "the" appears in many different contexts and also by itself. Therefore, the word "the" does not add any significant meaning when joined with the term "account number."

Classes are broader concepts that encapsulate or classify a set of terms. Classes describe semantic concepts to which classified terms are related. It is also to be understood that classes may also classify or encapsulate a set of subclasses in which the terms are classified. Non-limiting examples of classes, may include "objects", "actions", "modifiers", "documents", "service", "customers", or "locations". However, these are not intended to be limiting on the types of classes, particularly the types of classes that may appear in an ontology directed to a specific or specialized domain.

The classes, subclasses, and terms are connected by a plurality of relations. Relations are defined relationships between terms, terms and classes, terms and subclasses, and/or subclasses and classes. Furthermore, relations 308 may be linkages or relationships between the defined terms in the corpus. For example, the term "pay" may be related to the term "bill" to form the relation "pay>bill." In another non-limiting example, the term "pay" may be defined under the class "action" and the term "bill" may be defined in the class "documents". Still further binary directed relationships can be defined between these class/term pairs. For example, the action/pay pair may be related to the document/bill pair in that the payment action requires an underlying document, which may be a bill. In another non-limiting example, the term "broken" may be defined in the class "problems" and the term "iPhone" may be defined in the class "device". The problem/broken pair can also have a directed relationship to the "devices" class in which the "iPhone" term is a specific example as represented by the devices/iPhone pair.

Figure 9:
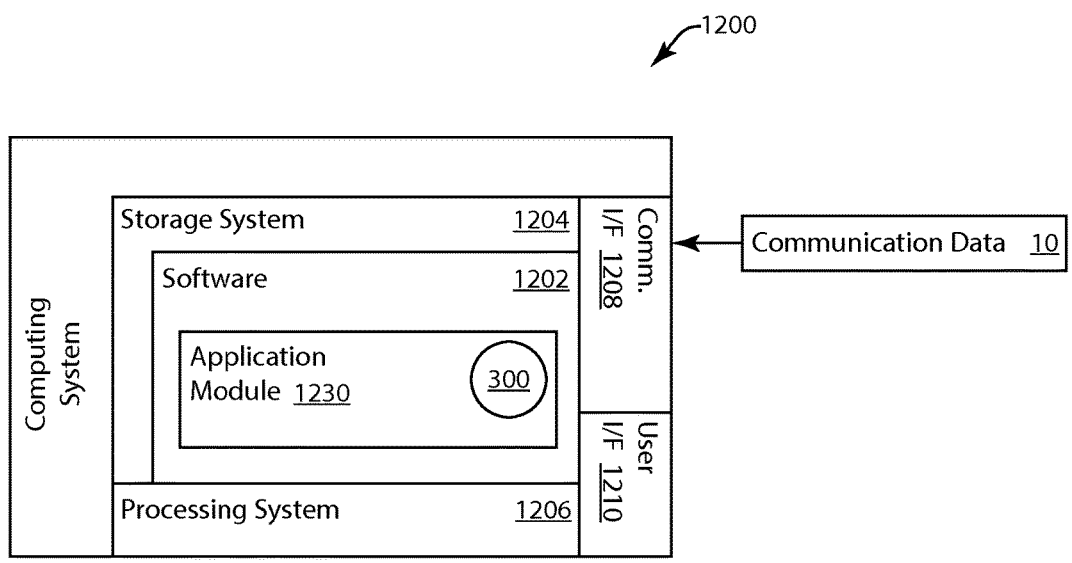
FIG. 9 is a system diagram of an exemplary embodiment of a system for developing an ontology for processing communication data.

FIG. 9 is a system diagram of an exemplary embodiment of a system 1200 for automated language model adaptation implementing an ontology training module 300. The system 1200 is generally a computing system that includes a processing system 1206, storage system 1204, software 1202, communication interface 1208 and a user interface 1210. The processing system 1206 loads and executes software 1202 from the storage system 1204, including a software application module 1230. When executed by the computing system 1200, software module 1230 directs the processing system 1206 to operate as described in herein in further detail, including execution of the ontology training module 300.

Although the computing system 1200 as depicted in FIG. 9 includes one software module in the present example, it should be understood that one or more modules may provide the same operation. Similarly, while description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or sub-systems that cooperate in existing program instructions. Examples of processing system 1206 include general purpose central processing units, applications specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or sub-systems. Storage system 1204 can further include additional elements, such a controller capable, of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210.

As described in further detail herein, the computing system 1200 receives communication data 10. The communication data 10 may be, for example, an audio recording or a conversation, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the communication data 10 may be streaming audio data received in real time or near-real time by the computing system 1200.

Figure 2:
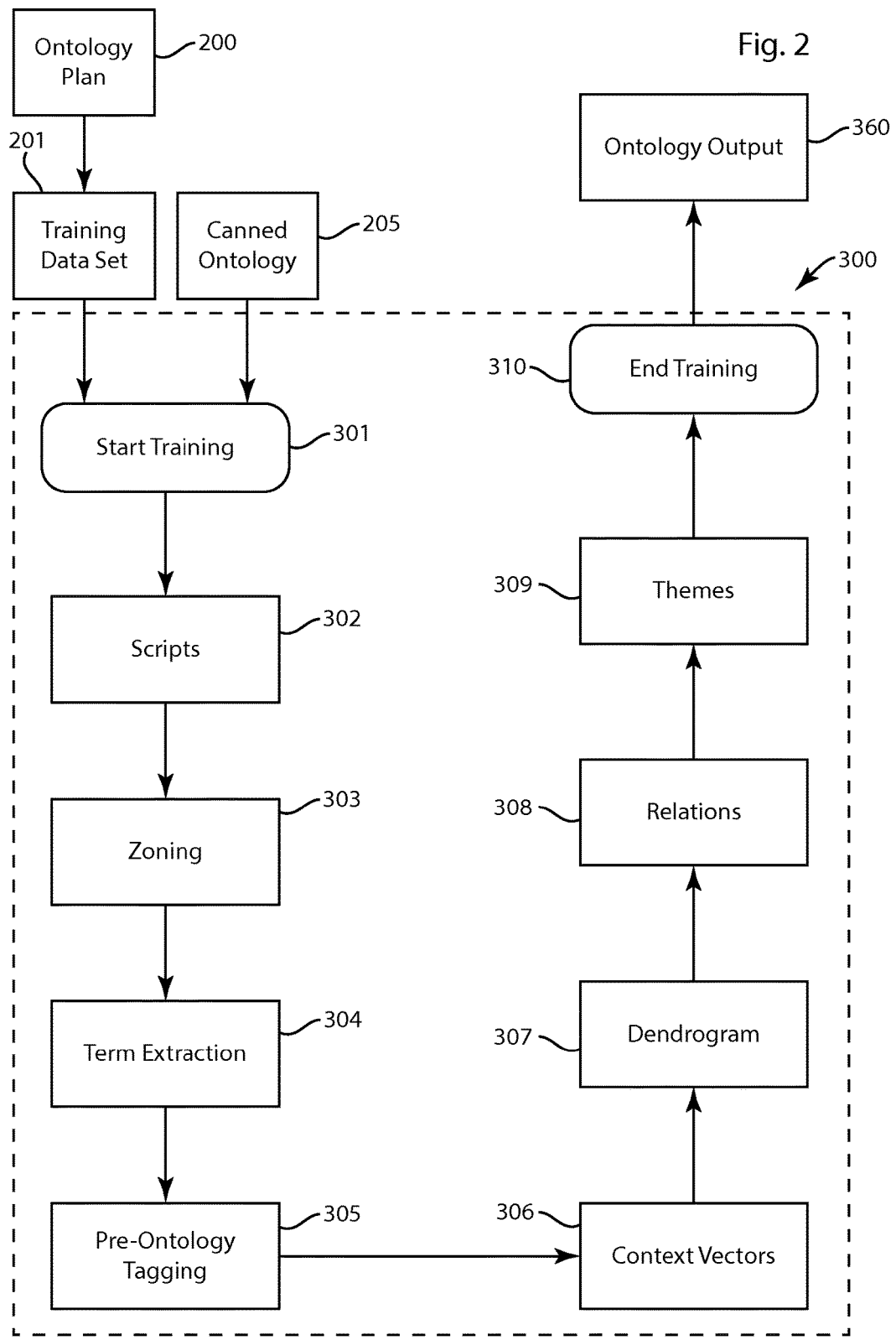
FIG. 2 is a schematic diagram of an embodiment of a process for ontology development.

FIG. 2 represents an overview of an exemplary training phase 101 for developing an initial ontology 110. The initial ontology 110 is built by a step-by-step pipeline process that applies various features to the defined data. These features include the extracting and surfacing of words and phrases in the corpus that helps users make non-trivial observations about a customer-specific domain.

As exemplified in FIG. 2, developing an ontology may begin with the prerequisite steps of developing an ontology plan 200 and sample data set 201. Developing an ontology plan 200 involves assessing a customer's business needs to develop a comprehensive plan for the ontological structure that can process the customer's data to provide the desired result. For example, developing an ontology plan 200 may involve determining how many ontologies are required for a specific customer. For example, customers may decide they need multiple ontologies to handle specialized types of data that can be categorized into different business domains.

Developing the sample data set 201 involves accumulating a good and varied range of data for each planned ontology. The data required for this purpose preferably originates from different time periods, for example, within about a month previous to the date of implementing the training step. The data is validated and gathered from different types of defined sources. Preferably, the ontology training process 1 is not executed until a certain, predefined amount of data is gathered for the training. For example, a configured scheduler may monitor the data gathering process and count the number of records or amount of data added. When the number of records or amount of data in the sample data set 201 reaches that predetermined amount, the scheduler may execute the ontology training process 1.

Once the sample data set 201 is fully developed, the training may begin. Additionally, the ontology training process can be assisted by starting with a "canned" ontology 205. A canned ontology 205 is an ontology that is developed for a particular business application or sector—a unique language model that reflects, or fits, the relevant business application. For example, a canned ontology 205 may be developed for telecommunications applications, and the telecom canned ontology 205 would differ from that developed for insurance industry applications, which would differ from the canned ontology 205 developed for the finance industry, etc. A user, or company, in a particular industry may begin the training process by implementing one or more relevant canned ontologies 205. The canned ontology is then refined during the ontology training and administration phases, 1 and 2 (FIG. 1), to develop a specialized ontology for that particular user. Additionally, if a user starts the training process by implementing more than one canned ontology 205, the canned ontologies are preferably unified during the ontology training and administration phases, 1 and 2, so that one, unified and encompassing ontology structure is developed for the user.

The canned ontology may be developed in various ways. For example, the canned ontology may be developed by taking data samples generated by multiple different users or entities in a particular industry. Alternatively, a canned ontology may be created by combining multiple ontologies in a particular industry. For example, multiple users may develop an ontology for their particular business based on their own internal data. Those individual ontologies may then be combined through a process of comparison, wherein the common elements in the ontologies receive heavier weight than the elements that differ. In still other embodiments, a canned ontology could be developed over a series of training processes where one user develops an ontology based on its data, and then the next user uses the first user's ontology as a canned ontology 205 input to its training process. Thereby, each subsequent user implements a previous user's output ontology as a canned ontology 205 input, and amends or refines that canned ontology 205 through the training process to develop its own ontology.

Once the sample data set 201 is fully developed, and/or the one or more canned ontologies 205 selected, the training phase 1 continues by executing a training module 300, an example of which is further depicted in FIG. 2. At step 301, the sampled data set 201 for each planned ontology 200 and/or canned ontology 205 is fed into the training module 300. The module 300 then identifies scripts 302 within the sample data set 201. Scripts are lengthy, repeated patterns that appear in the data set 201. Due to their length and frequency, scripts are highly likely to be accurately identified and the speaker of the script is also highly likely to be accurately identified. For example, a standard phrase spoken by a customer service agent, such as "Hello, how can I help you?" may comprise a script, and, at least in a customer service application, it is highly likely that that phrase is spoken by a customer service agent. Next, the module 300 executes a zoning process 303 that segments conversations within a defined corpus, or data set, into meaning units. Meaning units 68 are sequences of words that express an idea, and may be thought of as the spoken equivalent to sentences as found in written communication. A non-limiting example of a meaning unit in a customer service context would be the customer statement "I would like to buy a phone."

After the zoning process has been completed for the sample data set 201, the training module 300 executes term extraction 304. Term extraction 304 is a process that reviews all meaning units and extracts the terms that are meaningful in a corpus. A term is a short list of words (e.g. between 1 and 5 words) that has a precise meaning, or a meaning that stands out in its context. For example, "credit card" and "your account number" could both be appropriate terms. Next, the module 300 executes a pre-ontology step 305 that tags all overlapping terms in a non-overlapping way. Longer terms are generally preferred over shorter ones. For example, the term "my phone number" is counted as one term, rather than two—i.e. "my phone" and "my phone number."

Following the pre-ontology process step 305, the training module 300 processes the sample data set 201 to identify context vectors 306. Context vectors 306 are linkages between defined terms in the corpus, or data set, and the words that appear before or after each term. For example, the term "account" could be preceded by any of several terms, such as "have an," "to your," "a prepaid," "cancel my," or "my husband's." Likewise, the term "account" could be followed by any number of terms, such as "holder's", "receivable", or "been canceled." These so called left and right context vectors contain the predictive words for a main term, also referred to as a pivot term.

Identifying context vectors 306 forms the basis for the next step, building dendrograms 307, which is building a hierarchical clustering of terms. The training system uses the premise that terms that share contextual similarity and have similar linguistic characteristics share the same general meaning. In other words, terms with similar context vectors may be synonyms (e.g., purchase/buy), conceptually interchangeable (e.g., days, dates, locations), ontologically similar (e.g., financial transactions). Terms that share these characteristics are good candidates to be inserted in the ontology as a group of terms with similar meanings. In order to accomplish that, the system scans the context vectors of all terms created in the previous phase and clusters together terms with similar context vectors into a node. A dendrogram node, for example, may center around the term "purchase." The left context vector (preceding term) may be "want to", "need to", etc. While the right context vector (following term) may be "an i-phone", "the service", "high-speed internet."

In one embodiment, all detected terms in the corpus are located with similar terms in nodes on the dendrogram. Then, the dendrogram is transformed into a contextual similarity tree that only contains the stronger similarity nodes of the original dendrogram based on a similarity score algorithm that scores the similarity of the terms in the associated context vectors. The similarity score may be based on any number of factors for judging similarity of words and phrases. For example, the similarity score algorithm may employ databases containing syonyms, and thus may cluster synonyms together in a node. During this process, some terms may be eliminated and some are grouped or merged with other meaningful terms.

Preferably, a minimum number of terms are clustered into a node. For example, that minimum number may be four. In general, setting a minimum number of terms may allow the nodes to represent terms that are meaningful in the corpus, or dataset, which may facilitate a meaningful analysis of the grouped terms. By way of example, the following terms "purchase" and "buy" have similar context vectors:

| Term:     | Left Context Vector  | Want To, Need To,       |
|-----------|----------------------|-------------------------|
| Purchase  | (Before Term):       | Have To                 |
|           | Right Context Vector | An i-Phone, The         |
|           | (After Term):        | Service, High-Speed     |
|           |                      | Internet                |
| Term:     | Left Context Vector  | Want To, Need           |
| Buy       | (Before Term):       | To, Must                |
|           | Right Context Vector | i-Phone, High-Speed     |
|           | (After Term):        | Internet, A Service     |
|           |                      | That                    |

These two terms would be combined into one dendrogram node. The ontological premise is that there is a contextual similarity between these terms and therefore, they are clustered together. A set of dendrogram nodes can be presented as a hierarchical structure, such as a tree structure, where terms and clusters that are related are placed near one another in the structure.

FIG. 3 demonstrates a user interface display presenting a dendrogram. In the "Node Label" column, the nodes of the dendrogram tree are indicated next to each term. These nodes 55 indicate the location of each term in its respective cluster, or grouping. In the "Item Description" column, the terms are displayed and may be color-coded according to the nodes 55 in which they are grouped. The exemplary user interface at FIG. 3 allows a user to select and to display those dendrogram nodes 55 having a "minimal group size" and a "minimal similarity" (based on a similarity score algorithm). The exemplary display of FIG. 3 is displaying nodes having a minimum group size of 10 and a minimum similarity score of 2.0.

After the development of the dendrogram 307, relations 308 are developed within the sample data set 201. As described above, relations 308 are linkages or relationships between the defined terms or between entities and terms in the corpus. For example, "cancel>account," "speak with>supervisor," and "buy>new iPhone" are exemplary relations 308. In this respect, the goal of the training algorithm 300 may be to define a concise number of strong, meaningful relations 308 according to certain predefined policies or rules. In one embodiment, relations are given a relation score according to their compliance with certain, predefined metrics. Those strong relations are given a higher relation score, and thus are given preference over other, lower-scoring relations.

In one embodiment, relations may be defined based on their compliance with the following rules. First, the average transcription score of the terms in the relation should be relatively high (transcription score is described in more detail hereinbelow). Second, the number of occurrences of the relation within an interaction should be high. Third, a strong relation is one that complies with the words in close proximity to it. The following example is illustrative.

Figure 10:
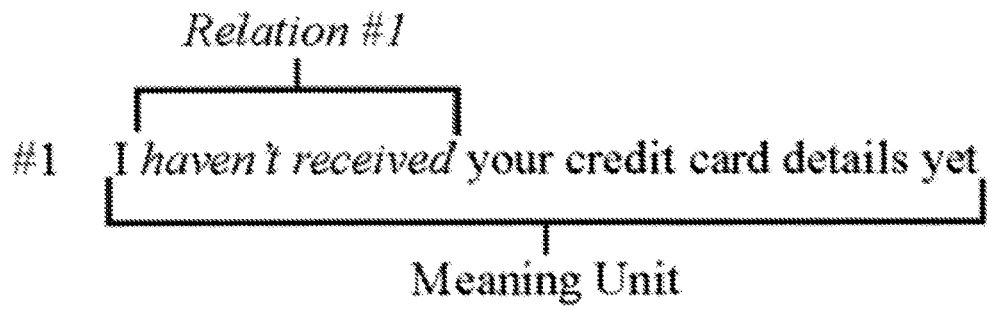
FIG. 10 is an example of a meaning unit diagram showing a first relation.
Figure 11:
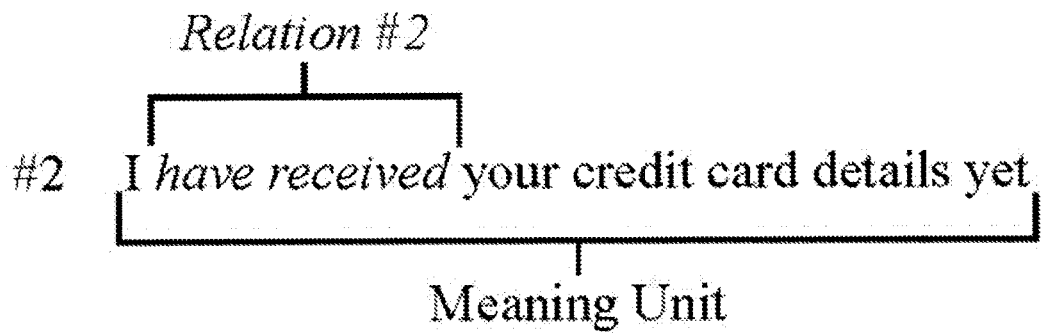
FIG. 11 is an example of a meaning unit diagram showing a second relation.

In the examples shown in FIGS. 10-11, the relation "haven't received" in FIG. 10 is a stronger relation than "have received" in FIG. 11 because it makes more sense within the context of the words in close proximity thereto (haven't received . . . yet, as opposed to have received . . . yet). Fourth, a relation is stronger, and thus scores higher, if the distance between the terms is relatively small. For example, in the phrase "I want to cancel my account," the relation between cancel>account is stronger than the relation between want>account. Fifth, a strong relation has relatively lengthy terms—i.e. the total number of words in a relation is high. This is because a relation with a higher number of words is likely to convey a more precise meaning and exact context. Sixth, and finally, strong relations are those whose terms appear more often within a particular corpus or dataset.

The training algorithm 300 may evaluate all possible relations, order them by score, and define, or designates, as relations 308 those relationships that do not contain one or more conflicts. For example, relations are not allowed to cross over one another.

Figure 12:
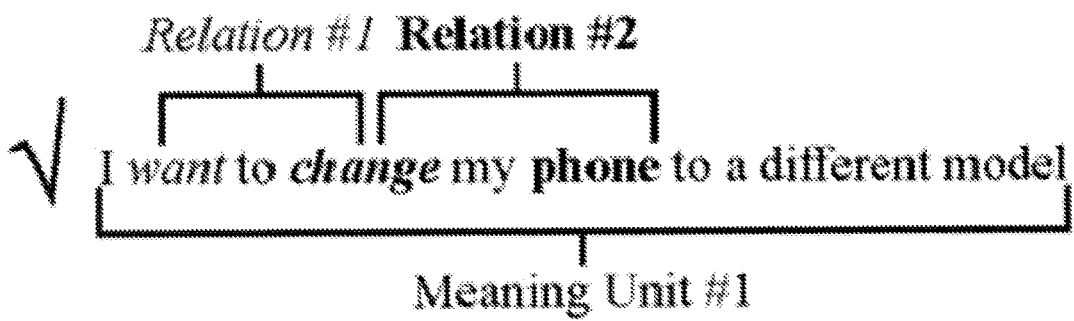
FIG. 12 is an example of a meaning unit diagram showing two relations that do not cross over one another.
Figure 13:
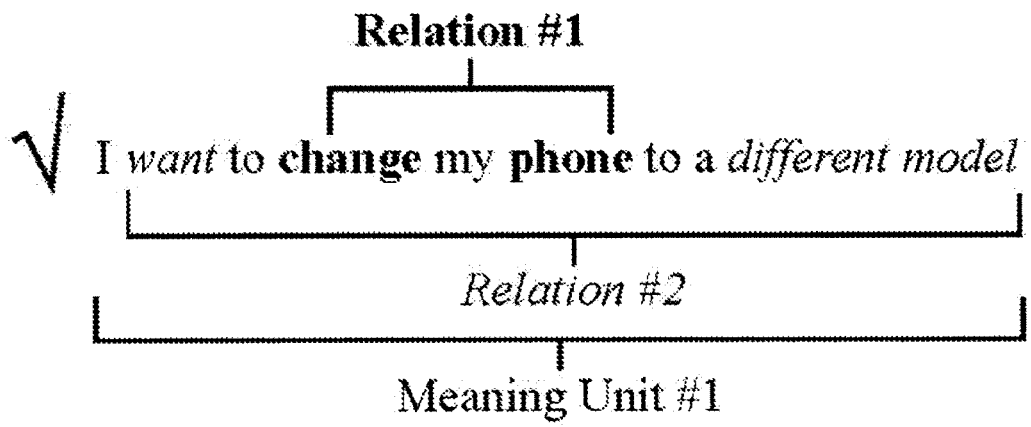
FIG. 13 is another example of a meaning unit diagram showing two relations that do not cross over one another.
Figure 14:
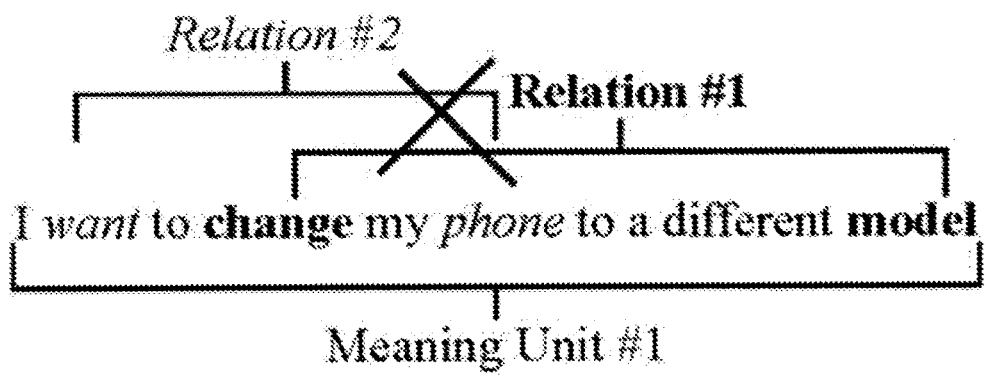
FIG. 14 is an example of a meaning unit diagram showing two relations that do cross over one another.

In the example shown in FIG. 12, the relation want>change and change>phone are valid relations. Even though they share the term "change", the relations themselves do not cross over each other in the meaning unit. Likewise, the terms in the relations want>different model and change>phone shown in FIG. 13 do not cross over each other in the meaning unit, and thus are also valid relations. In the example shown in FIG. 14, however, the potential relations want>phone and change>model do cross over each other in the same meaning unit. Therefore, this goes against the relations policy and only one of the potential relations can actually be determined and designated as a relation 308. The example shown in FIG. 14 demonstrates a violation of this policy.

In fact, the relation want>phone does not make sense in this context, as the meaning of the sentence is about "changing" the phone. Likewise, change>model is not a strong relation, as it is unclear what "model" refers to without reading the meaning unit. Thus, neither of those relations would be defined for this meaning unit.

Similarly, a term instance in the same meaning unit cannot be assigned to multiple, different classes at the same time. In some cases, the same term in different meaning units may be assigned to more than one class—for example, phone can be assigned to two classes, depending on the context in the meaning unit (e.g. the word "phone" can be a noun or a verb: I have a "phone" vs. can I "phone" you). However, if the same term in the same meaning unit is defined and assigned to more than one class, a disambiguation process resolves the conflict. For example, the algorithm prevents the term "phone" in a single meaning unit to be assigned to a device and an action class simultaneously.

Likewise, a particular instance of a word cannot be assigned to more than one term. For example, the word "phone" in the example below cannot be assigned to more than one term.

Figure 15:
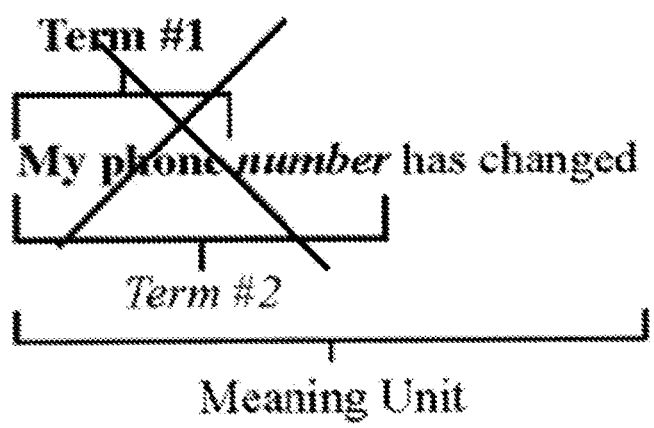
FIG. 15 is an example of a meaning unit diagram showing two terms where a word is assigned to both of the terms.

In the example shown in FIG. 15, there are two potential terms: "my phone" and "my phone number". However, because the words in these terms overlap in the text, they cannot be defined as two separate terms. In this case, the term that is defined is "my phone number" because it is longer in length than "my phone."

Based upon the relations 308, the system identifies, or surfaces, themes 309 are existing within the dataset. Themes 309 are groups or categories of relations that are similar in meaning. A theme 309 represents a concept defined by its associated relations. A theme 309 may encapsulate the same concept among several portions of a set of communication data, such as among several customer service interactions. Themes 309 allow users to easily and efficiently understand the characteristics of interactions throughout the corpus. For example, the theme "got an email" might correspond to several relations, including "got the email," "got confirmation," "received an email," "received an email confirmation, " etc. In a call center data set, for example, one theme may represent a concept expressed in several different calls. In that way, a theme can provide a summary, or a compressed view, of the characteristics of the interactions in a communications data set. Preferably, a particular relation is assigned to only one theme.

Themes act as building blocks employed by analytics applications or modules. In one embodiment, themes are tagged in the tagging phase 3, along with terms and relations. In other embodiments, themes may not be tagged in the tagging phase 3. In such an embodiment, only terms and relations may be tagged in the tagging phase 3. Themes may then be determined in the analytics phase 4, and may be determined differently by different analytics modules or applications.

In one embodiment, themes can be identified using the following algorithm, or method. First, the term pairs, or relations, in a corpus are scored according to the following algorithm:

$$\text{score}(\text{term1}, \text{term2}) = \frac{\text{join\_count}(\text{term1}, \text{term2}) \times \text{length\_in\_letters}([\text{term1 term2}])}{\text{average\_distance}(\text{term1}, \text{term2}) + 1}$$

wherein, "joint count" represents the number of times the terms appear together in the dataset (or a designated subset of the dataset). In various embodiments, the terms may be required to appear in the specified order. The "length in letters" represents the length of the words (letters or characters), taken together, in the term set (or relation). Those numbers are multiplied together and divided by the "average distance" between the terms plus 1. The average distance may be calculated as the average number of words that appear between the two terms of the relation throughout the dataset. Alternatively, the average distance may be calculated as the average number of letters or characters between the two terms throughout the dataset. Strong, or high scoring, term sets are those that are long (have many letters) with high appearance count and that appear close together. Low scoring term sets are short, appear infrequently, and are far apart in the data set (indicating loose context). High scoring term pairs, or relations, are valued over low scoring pairs.

After the relations, or term pairs, are scored, the relations may be listed in descending order based on that score. That list of scored relations may then be truncated so that only a certain number of top scoring relations are maintained. For example, the list may be truncated to retain a pre-defined constant number of relations. Alternatively, a predefined percentage of the relations may be kept. In still other embodiments, only relations with certain minimum scores are kept.

Before or after the list is truncated, the scores for each of the relations in the list may be normalized by assigning them a new score according to their rank in the list. In one embodiment, the score is normalized in descending order, with the best pair (highest scoring term pair) receiving the highest normalized score and the worst pair (lowest scoring term pair) receiving the lowest normalized score.

Figure 4:
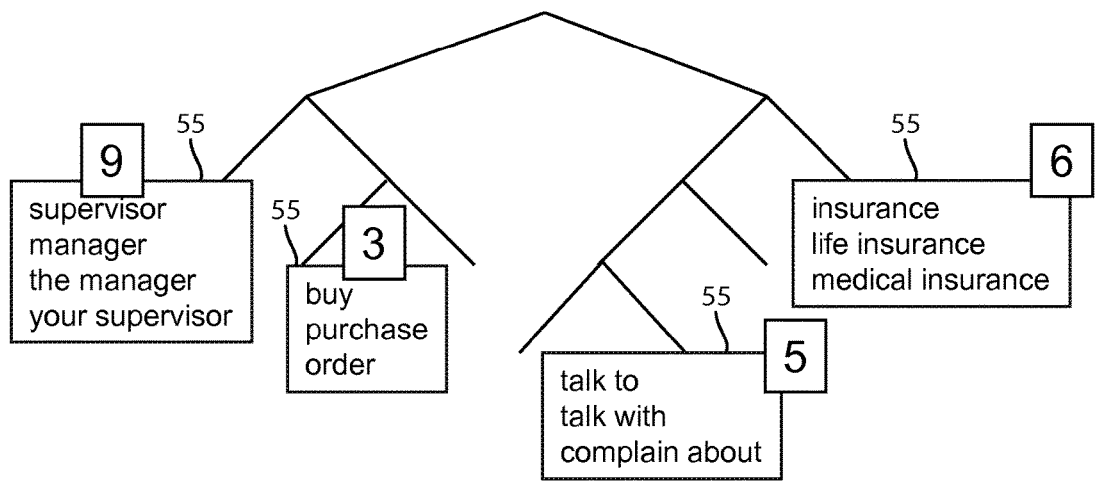
FIG. 4 is a schematic diagram of an exemplary process for identifying a node pairs list.
Figure 4:
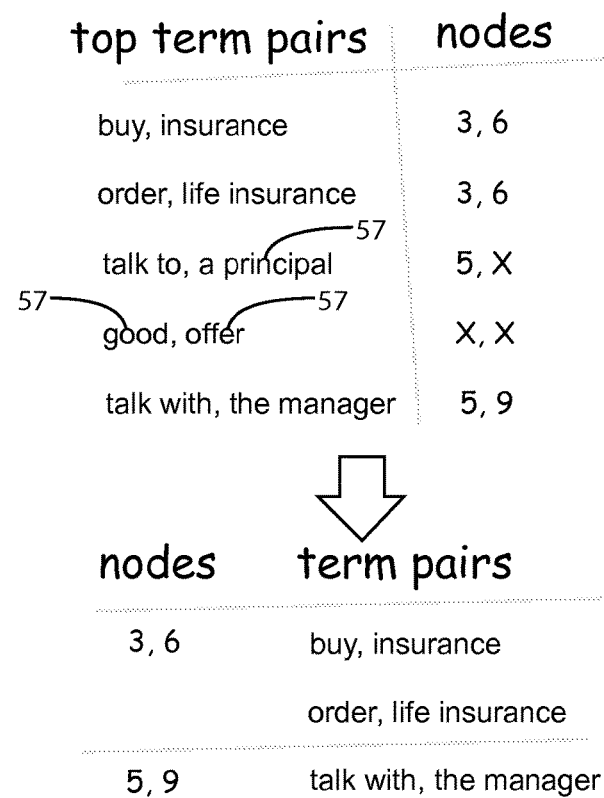

Then, for each term of each relation in the list, a corresponding node, if it exists, is identified for each of the terms in the relation. Thus, a pair of nodes is identified, where possible, for each of the relations. Additionally, parent and/or grandparent nodes may be identified, if they exist. If found, the term pair is assigned to the identified dendrogram node pair, and a list of nodes is developed. Relations, or terms pairs, belonging to the same nodes pair can be grouped together. For example, as seen in FIG. 4, each node 55, or dendrogram cluster, receives a node number. Each term pair is then correlated with its corresponding node pair. For instance, in FIG. 4 the term pair buy>insurance and order>life insurance both correlate to the node pair 3>6. Accordingly, those term pairs may be grouped together and identified according to their node pair.

As is also illustrated in FIG. 4, some terms may not be assigned to or associated with any dendrogram node and thus may not have a corresponding node number. Such terms are referred to herein as "ungrouped" terms 57. For example, in FIG. 4 the term pair talk to>a principal, the term "a principal" was not identified as being associated with any node and thus did not receive a node number. In those instances node numbers may still be identifiable, or associatable, with the relation if the unassociated or ungrouped terms can be affiliated with nodes having textually similar terms. For example, such affiliation can be assessed by using character trigram similarity, which compares the literal similarity between the words in two separate relations or terms. Character trigram similarity assesses the similarity of words by comparing the letters of each of the words in each of the relations with one another to produce a similarity score between two terms.

As exemplified in FIG. 5, one way to calculate a similarity score is by parsing the relations or terms into letter triplets and determining whether those letter triplets appear in each relation or term. The character trigram similarity of two terms can be assessed according to the following algorithm:

$$\text{similarity}(a, b) = \frac{\sum_{\text{trigram } t \in a,b} \min(\text{count of } t \text{ in } a, \text{count of } t \text{ in } b)}{\text{number of trigrams belonging to } a + \text{number of trigrams belonging to } b}$$

In this way, the letter strings in each term are compared and their similarity is determined. Terms that have sufficiently similar letter strings in them are grouped together, for example in the same node. Thereby, previously unassociated terms can be placed into a group. For example, an unpaired term or relation may be added to a node or node pair when it has at least a minimum threshold similarity score with another term grouped in that node.

Preferably, the nodes are expanded to incorporate as many of the identified terms and relations as possible. Since, for instance, communication data may commonly be derived from speech-to-text translation algorithms, and because those algorithms are imperfect and often make slight mistranscriptions, it is desirable to use algorithms that can associate textually similar terms together—e.g., manager and managers, Sunday and Monday. Thus, as described above, unassociated relations can be assimilated into the established node groupings by comparing them with already-grouped relations, for example using character trigram similarity. For relations that remain unassociated after such a comparison with the already-grouped relations, additional associations can be made by comparing the unassociated relations with one another. For example, the character trigram similarity algorithm can be used to compare and group the unassociated relations with one another. In some embodiments, the threshold for clustering or grouping relations into nodes in the first instance may be higher than the threshold for grouping the ungrouped or unassociated relations with the already-grouped relations. After all comparisons are completed, relations whose terms do not have any similarity linkages to other terms and thus cannot be clustered with other relations, are discarded as unimportant.

Once all of the terms are placed into node number pairs or are discarded, the remaining list of node number pairs indicates groups of term pairs—i.e., groups of relations. In some embodiments, this list of grouped relations may be identified as a list of "theme candidates" because it contains groups of relations that could potentially be identified as themes. In other embodiments, all of the groups of relations may be assigned to a theme, and then unimportant or irrelevant themes, if any, may later be eliminated.

The identified themes, or the list of theme candidates, can be paired down using any number of techniques. For example, the themes or theme candidates can be assessed according to various metrics and assigned a theme score. In one such example, a theme may be scored by averaging the scores (or normalized scores) of its original term pair members. Alternatively or additionally, the themes or theme candidates may be compared to a pre-created, or "canned", list of important terms or themes. The "canned" list can be one that is created based on similar datasets, for example based on datasets belonging to another user in the same or similar industry. The theme candidates that appear on the "canned" list of important themes, or whose terms appear on a list of important terms, may then be elevated as important, or high scoring, themes. Likewise, the list of theme candidates may be compared to a "canned" list of unimportant terms. The theme candidates that appear on the unimportant list can be removed and purged because they are insignificant and do not add anything to the analysis.

Alternatively, or additionally, the theme candidates may be scored based on their number of members, or number of relations or terms associated therewith, with the candidates having the most members receiving the highest score. The theme candidates can also be scored according to their class consensus, where themes having more terms that belong to the same class or defined groups of classes are scored higher than those with terms belonging to disparate classes. Another scoring means is by diversity, where themes with a greater number of unique terms on either side of the relations receive a higher score.

Alternatively or additionally, the list of theme candidates can also be refined by a user, for example, at the ontology administration stage 2. In one embodiment, the theme candidates are scored according to a number of different metrics, such as those listed above, and the then the scores are added together or averaged to calculate a final score. The theme candidates with the highest final scores can then be classified or identified as themes and used as a foundation for the analytics structure. Conversely, themes or theme candidates having a relatively low theme score or a theme score below a certain threshold may be eliminated.

Figure 6:
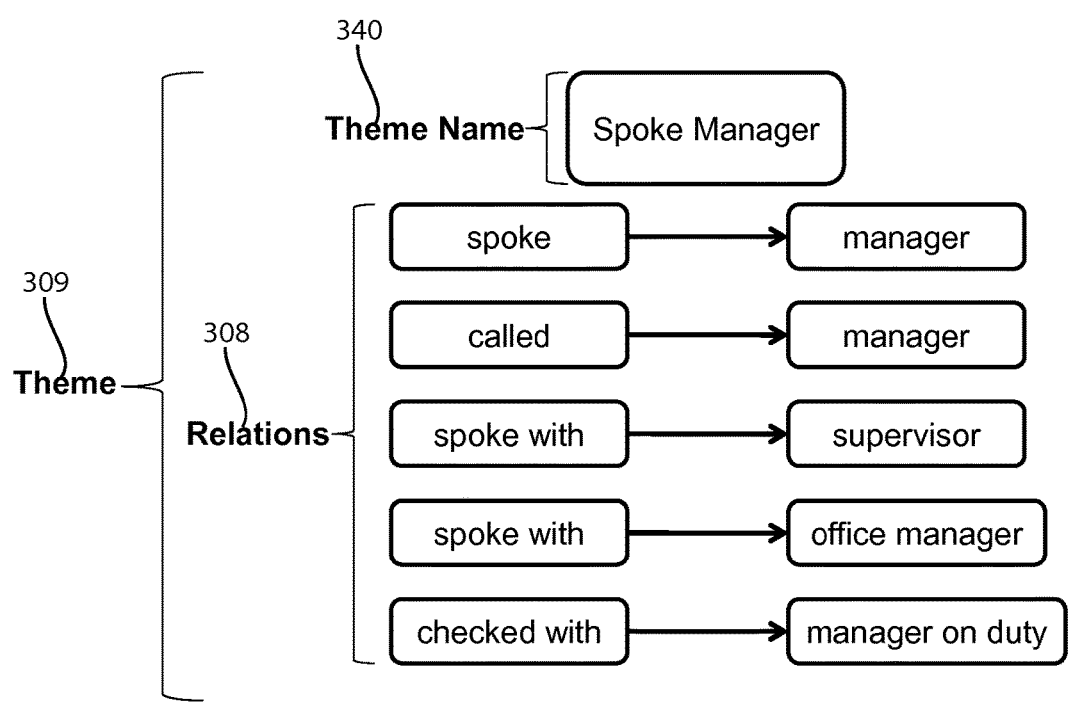
FIG. 6 is an exemplary display conveying information about themes in a dataset.

Themes can be displayed by displaying some or all of the relations comprising that theme and providing statistics about the appearance of such relations and/or the terms therein. For example, as seen in FIG. 6, information about themes 309 and relations 308 in a communication data set can be displayed by displaying the terms therein and connecting them with lines. Further detail may be added to the display to convey additional information. For example, the strength of the connections between words is illustrated by the thickness of the line. The terms may be grouped by class, so that, for example, all of the "objects" are aligned in one column and connected with all of the "actions" aligned in another column. In an additional embodiment, each relationship, or connection between terms, may be labeled or described. For example, connections between employees and the customers they have served can be identified as a particular relationship. Other relationships might be identified as being related to a complaint, related to a contractual obligation (e.g. a warranty or service contract), etc.

Additionally, multiple themes can be viewed at one time. For example, all of the themes represented in a corpus may be displayed. Alternatively, a portion of the themes may be displayed, such as the most common themes or the themes most related to a particular term or theme, such as a term or theme identified by a user. In one embodiment, depicted in FIG. 7, themes can be viewed in a Theme Visualization Tree Map 410. Any number of user interface mechanisms can be employed to allow a user to interact with and display the tagged data, and the interface mechanisms can be designed to incorporate any number of data formats according to what type of data is incorporated in the communications data set. As demonstrated in FIG. 7, the Tree Map 410 provides users with a tool to visualize customer service call data. Using the Tree Map 410, the user can select different view of the same data related to themes 326 and their associated relations 328. By selecting different performance metrics, filtering the data set to view related themes, and drilling down to view detailed information about a specific theme, the user can gain different perspectives on the data. In still other embodiments, the theme visualization may be in a list view, wherein theme data is displayed in a table format. Such a table may include theme names, the number of interactions with which each theme is associated, the percentage of the interactions in the data set in which each theme appeared, the relations associated with that theme, and the importance of that theme in signifying or representing the overall purpose of the interaction.

Figure 7:
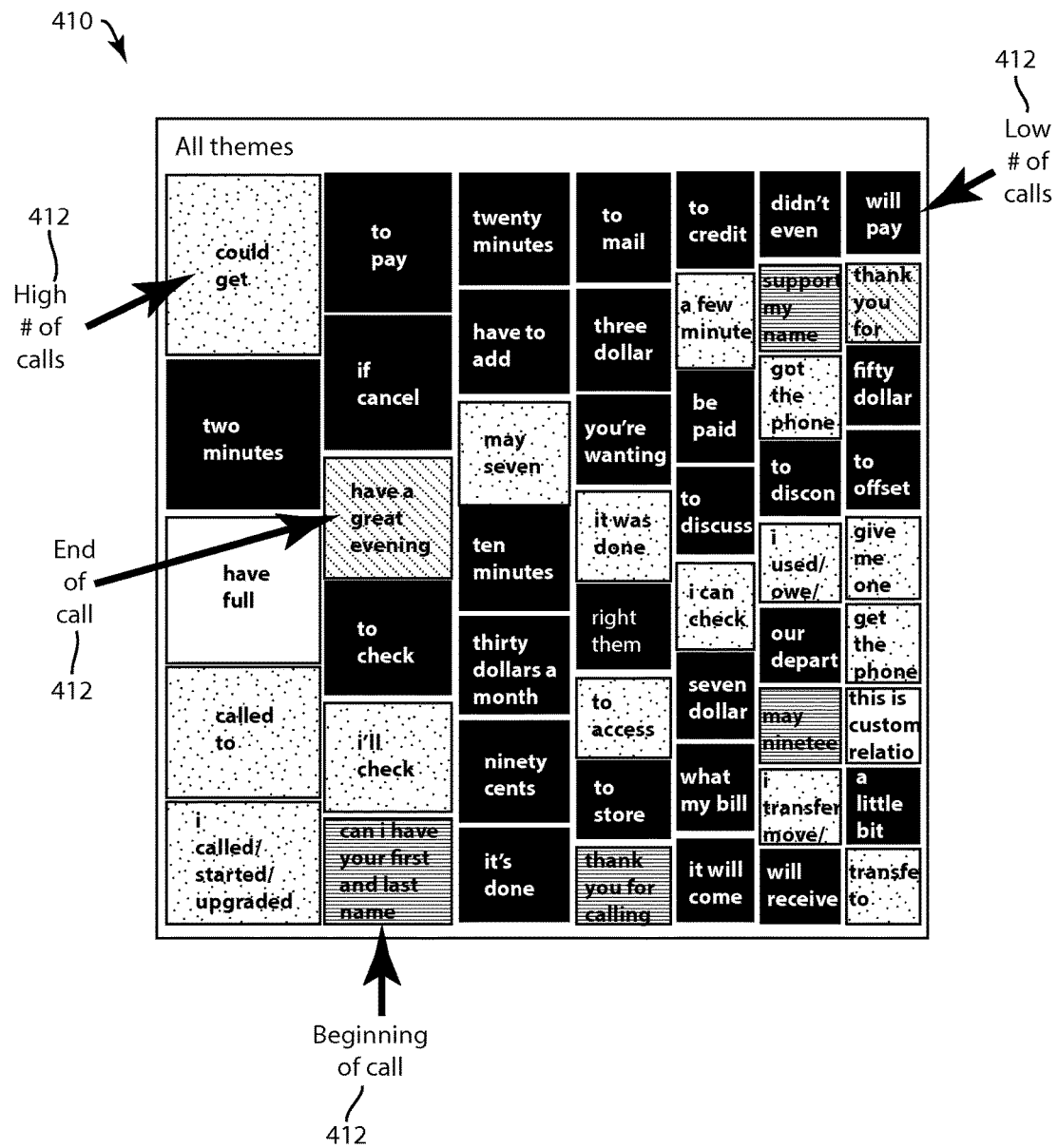
FIG. 7 is another exemplary display conveying information about themes in a dataset.

As seen in FIG. 7, the user can use the Tree Map 410 to view theme performance according to certain selected metrics 412. This exemplary communication data regarded in FIG. 7 regards customer service call data, and the exemplary metrics regarded in the display are "average position in call" (beginning to end) and "number of calls." However, it is contemplated that the Tree Map display may be applied to any number of metrics regarding any type of data, including duration of interaction associated with a theme or percentage of silence (period where neither employee or customer is communicating) associated with a theme 309. The Tree Map 410 employs a color/size coding scheme to convey information about themes 309 according to the selected metrics. In FIG. 7, themes found in a relatively high number of calls are displayed in a relatively large cell, whereas themes that rarely appeared are displayed in relatively small cells. Color coding is used to show where the themes fell within the span of the calls in the processed data set. For example, cells shaded orange and/or or red may be used to represent themes that typically appeared relatively early in the call, whereas yellow and/or green may represent themes that typically fell relatively late in the call.

Figure 8:
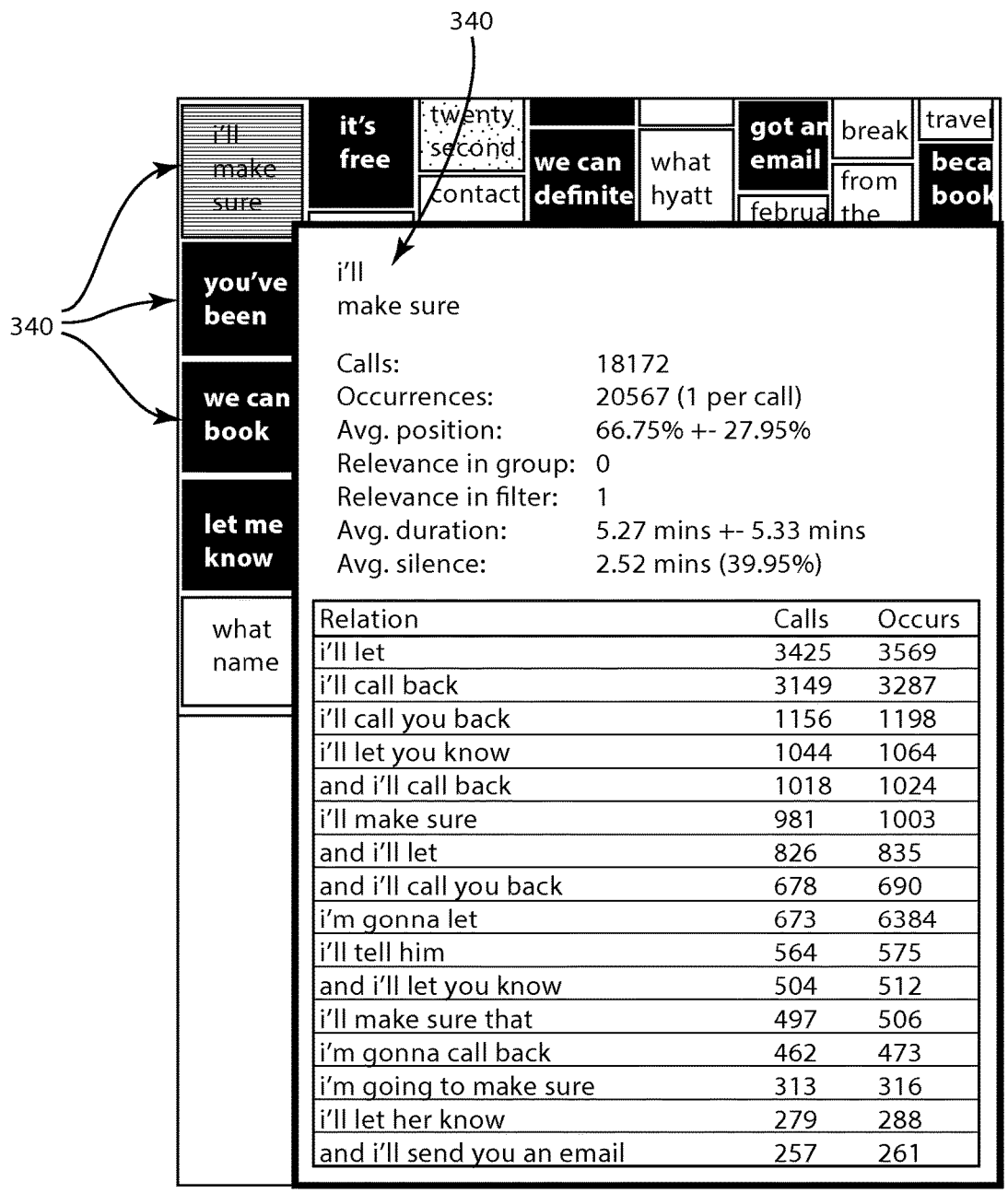
FIG. 8 is another exemplary display conveying information about themes in a dataset.

In some embodiments, the Theme Visualization Tree Map 410 (or any other display mechanism) can be employed to allow a user to view theme statistics, view and/or play snippets of a communication, or filter and chart themes or theme statistics. Useful statistics may include, for example, the total number of interactions associated with a theme or a theme's relations, the number of occurrences of the theme or the theme's relations in a call set, etc. For example, as seen in FIG. 8, data about a particular theme in the Tree Map 410 can be displayed, for example, upon a user selecting a theme 309 on the Tree Map 410. The data displayed in exemplary FIG. 8 includes the theme name 340, data about the theme in the corpus, and the relations that comprise the theme. As shown in the exemplary figure, for the theme "I'll make sure," the average duration of the call is 5.27 minutes, the theme appeared in 18172 calls, and the theme occurred a total of 20567 times (appeared more than once in some calls).

Specifically, several exemplary statistical categories are identified in FIG. 8. Calls represent the total number of interactions associated with the theme, and total number of interactions associated with a specific relation assigned to the theme. Occurrences represent the total number of times the theme appears in the call set, and the number of times the specific relation appears in the call set. The Average Position is the average position within the interaction that the tracked items in the theme appear (beginning, middle, end). In this example, the tracked items in this theme seem to appear in the middle of the interaction, and a little beforehand. Relevance in group/filter indicates how relevant the theme is in a specific group or selected filter. Average duration is the average call duration of all of the interactions tagged by this theme. Avg. silence is the average amount of silence time per interaction for all of the interactions tagged by this theme. Further, below the statistical data regarding the theme, a list of the relations associated with the theme conveys the total number of interactions in which each listed relation was detected and the number of times that relation occurred in the corpus.

Additionally, themes can be filtered to identify and view those themes that correlate or relate to, or contain a similar set of relations to, a particular theme. Filtering themes allows a user to view themes that are correlated or related to one another, for example by listing the correlated themes in descending order, with the most correlated theme(s) being identified first. Alternatively or additionally, a user may view which themes are associated with different types of interactions, such as long calls or calls with long silent periods. Additionally, a user may view all calls with a high prevalence of a certain theme. For example, a user may select the theme "Emotion" (e.g., from a Tree Map 410) from a dataset comprised of customer call data, and the system would display details about calls that included terms and relations associated with the "Emotion" theme—i.e. called that included emotional words such as "upset," "frustrated," or "happy." Further, the filter may further be employed to identify datasets where two themes appear near one another. For example, where the "Emotion" theme appears near to the "Speak with supervisor" theme.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of processing e-communication data by a computer system to identify one or more themes within the communication data, the method comprising:
    accessing, by a processing system of a computer system, a set of communication data stored in a storage system of the computer system;
    identifying, by the processing system, terms in the set of communication data, wherein a term is a word or short phrase;
    defining, by the processing system, relations in the set of communication data based on the terms, wherein a relation is a pair of terms that appear in proximity to one another;
    calculating, by the processing system, a relation score for each relation based on a frequency that the terms of the relation appear together in the set of communication data, the number of letters in the terms of the relation, and/or the proximity of the terms to one another, wherein relations that appear relatively frequently in the set of communication data and/or have terms with more letters are given a higher score, wherein the score is lowered for those relations whose terms appear relatively far apart in the set of communication data, wherein scoring each relation includes multiplying a number of times that the terms of the relation appear in the set of communication data by a number of total characters in the terms of the relation, and dividing by 1+an average distance between the terms of the relation as it appears in the set of communication data;
    identifying, by the processing system, themes in the set of communication data based on the relations, wherein a theme is a group of one or more relations that have similar meaning; and
    storing, by the processing system, the terms, the relations, and the themes in a database.

2. The method of claim 1 further comprising identifying a context vector for each term based on the words appearing before and after that term;
    grouping the terms into nodes based on the context vectors, wherein the terms with similar context vectors are put into the same node; and
    grouping the relations with the same nodes.

3. The method of claim 2 further comprising assigning a unique node number to each node; and
    associating the unique node number with each term grouped into that node;
    wherein the step of grouping the relations with the same term nodes includes grouping the relations containing terms with the same node numbers.

4. The method of claim 2 further comprising:
    identifying at least one ungrouped term, wherein the ungrouped term is one that is not grouped into the nodes;
    determining a similarity score of the ungrouped term to one or more of the terms grouped into the nodes by performing character trigram similarity; and
    grouping the ungrouped term into one of the nodes if the similarity score of the ungrouped term to one or more of the terms grouped into that node is at least a threshold similarity score.

5. The method of claim 2 further comprising displaying at least a portion of the grouped relations to a user.

6. The method of claim 2 wherein the step of identifying themes is further based on the grouped relations.

7. The method of claim 1 further comprising eliminating low-scoring relations prior to the step of identifying the themes in the set of communication data.

8. The method of claim 1 further comprising calculating a theme score for each theme by averaging the scores of each relation grouped into that theme, and eliminating low-scoring themes.

9. The method of claim 1 further comprising displaying at least a portion of the themes to a user, prompting the user to eliminate themes.

10. The method of claim 1 further comprising:
    calculating a theme score for each theme based on the number of relations associated therewith, the number of unique terms associated therewith, and/or the number of classes associated therewith; and
    eliminating themes having a theme score below a threshold.

11. A method of processing communication data by a computer system to identify one or more themes within the communication data, the method comprising:
    accessing, by a processing system of a computer system, a set of communication data stored in a storage system of the computer system;
    identifying, by the processing system, terms in the set of communication data, wherein a term is a word or short phrase;
    defining, by the processing system, relations in the set of communication data based on the terms, wherein a relation is a pair of terms that appear in proximity to one another;

calculating, by the processing system, a relation score for each relation based on a frequency that the terms of the relation appear together in the set of communication data, die number of letters in the terms of the relation, and/or the proximity of the terms to one another, wherein relations that appear relatively frequently in the set of communication data and/or have terms with more letters are given a higher score, wherein the score is lowered for those relations whose terms appear relatively far apart in the set of communication data, wherein scoring each relation includes multiplying a number of times that the terms of the relation appear in the set of communication data by a number of total characters in the terms of the relation, and dividing by 1+an average distance between the terms of the relation as it appears in the set of communication data;

identifying, by the processing system, themes in the set of communication data based on the relations and the relation scores; and storing, by the processing system, the terms, the relations, scores and the themes in a database.

12. The method of claim 11 further comprising:
calculating a theme score for each theme, wherein the theme score is based on the relation scores of the relations associated with the theme; and
eliminating themes with theme scores below a threshold.

13. The method of claim 12 further comprising:
comparing the themes to a list of important themes, raising the theme score for those themes appearing on the list of important themes.

14. A non-transient computer readable medium programmed with computer readable code that upon execution by a processor causes the processor to execute a method of processing a set of communication data, the method comprising:
accessing a set of communication data;
identifying terms in the set of communication data, wherein a term is a word or short phrase;
defining relations in the set of communication data based on the terms, wherein a relation is a pair of terms that appear in proximity to one another;
identifying a context vector for each term based on the words appearing before and after that term;
grouping the terms with similar context vectors into a node;
grouping relations with the same nodes into groups of relations;
calculating a relation score for each relation based on a frequency that the terms of the relation appear together in the set of communication data, the number of letters in the terms of the relation, and/or die proximity of the terms to one another, wherein relations that appear relatively frequently in the set of communication data and/or have terms with more letters are given a higher score, wherein the score is lowered for those relations whose terms appear relatively far apart in the set of communication data, wherein scoring each relation includes multiplying a number of times that the terms of the relation appear in the set of communication data by a number of total characters in the terms of the relation, and dividing by 1+an average distance between the terms of the relation as it appears in the set of communication data;
identifying theme candidates in the set of communication data based on the groups of relations;
calculating a theme score for each theme candidate;
identifying themes as those theme candidates having at least a threshold theme score; and
storing the terms, the relations, and the themes in a database.

15. The non-transient computer readable medium of claim 14 wherein the theme score is based on the number of relations associated therewith, the number of unique terms associated therewith, and/or the number of classes associated therewith.

* * * * *